(12) United States Patent
Kobayashi et al.

(10) Patent No.: US 11,211,648 B2
(45) Date of Patent: Dec. 28, 2021

(54) POWER STORAGE DEVICE COOLING STRUCTURE

(71) Applicant: TOYOTA JIDOSHA KABUSHIKI KAISHA, Toyota (JP)

(72) Inventors: Takenori Kobayashi, Toyota (JP); Ikko Iwase, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 369 days.

(21) Appl. No.: 16/250,500

(22) Filed: Jan. 17, 2019

(65) Prior Publication Data
US 2019/0237825 A1 Aug. 1, 2019

(30) Foreign Application Priority Data
Jan. 31, 2018 (JP) .............................. JP2018-014580

(51) Int. Cl.
| | | |
|---|---|---|
| *H01M 10/613* | (2014.01) | |
| *H01M 10/625* | (2014.01) | |
| *H01M 10/6563* | (2014.01) | |
| *H01M 10/6566* | (2014.01) | |
| *H01M 10/6557* | (2014.01) | |
| *H01M 50/20* | (2021.01) | |

(52) U.S. Cl.
CPC ........ *H01M 10/613* (2015.04); *H01M 10/625* (2015.04); *H01M 10/6557* (2015.04); *H01M 10/6563* (2015.04); *H01M 10/6566* (2015.04); *H01M 50/20* (2021.01); *H01M 2220/20* (2013.01)

(58) Field of Classification Search
CPC ............. H01M 10/613; H01M 10/625; H01M 10/6557; H01M 10/6563; H01M 10/6566
See application file for complete search history.

(56) References Cited

U.S. PATENT DOCUMENTS

2017/0373361 A1   12/2017   Kosaki et al.

FOREIGN PATENT DOCUMENTS

| CN | 107546347 A | 1/2018 | |
|---|---|---|---|
| EP | 1408209 A1 * | 4/2004 | ........... B60K 15/067 |
| JP | 4224388 A | 8/1992 | |
| JP | 2016-132314 A | 7/2016 | |
| JP | 2016132314 A * | 7/2016 | |
| JP | 2017-107660 A | 6/2017 | |

(Continued)

OTHER PUBLICATIONS

Hara et al., JP 2016132314 A, English Machine Translation, pp. 1-17. (Year: 2016).*

(Continued)

*Primary Examiner* — Tae-Sik Kang
(74) *Attorney, Agent, or Firm* — Sughrue Mion, PLLC (57) ABSTRACT

Defective assembling of a duct to a battery module is reduced. A distribution duct has a plurality of distribution paths supplying refrigerant to each of a plurality of ventilation paths. A distribution path and a ventilation path are connected by an insertion structure in which the distribution path is inserted into the ventilation path. A distribution path has an open outlet end surrounded by a coupling portion, and is connected to a ventilation path via a planar sealing structure in which a sealing material is held on the coupling portion in a compressed state.

6 Claims, 5 Drawing Sheets

(56) References Cited

FOREIGN PATENT DOCUMENTS

JP           2017107660 A  *  6/2017
JP           2017228495 A     12/2017

OTHER PUBLICATIONS

Masatoshi Hayashishita, JP 2017107660 A, English Machine Translation, pp. 1-10. (Year: 2017).*

1A Auto, "How to Replace Intermediate Exhaust Pipe 97-01 Toyota Camry", Retrieved from the internet: URL: https://www.youtube.com/watch?v=_FhpTDzxLn4&t=309s. (Year: 2016).*

* cited by examiner

POWER STORAGE DEVICE COOLING STRUCTURE

This nonprovisional application is based on Japanese Patent Application No. 2018-014580 filed on Jan. 31, 2018 with the Japan Patent Office, the entire contents of which are hereby incorporated by reference.

BACKGROUND

Field

The present disclosure relates to a power storage device cooling structure.

Description of the Background Art

Conventionally, an in-vehicle battery including a plurality of battery modules each having a plurality of battery cells disposed therein and a housing case for housing the plurality of battery modules comprises an air intake duct for blowing air into the plurality of battery modules to cool them, for example as disclosed in Japanese Patent Laying-Open No. 2016-132314.

SUMMARY

In the configuration described in the above document, the air intake duct has a plurality of end portions respectively inserted into and coupled to a plurality of coupling portions protruding from a side surface of the housing case to form an inflow path for the cooling air. When the housing case and/or the air intake duct have/has a manufacturing tolerance, a relative positional relationship between a coupling portion of the housing case and an end portion of the air intake duct may be deviated. In that case, it may be difficult to insert an end portion of the air intake duct into some of the plurality of coupling portions of the housing case.

In the present disclosure, a structure which cools a power storage device, that can reduce defective assembling of a duct to a battery module, is provided.

According to the present disclosure, there is provided a power storage device cooling structure comprising: at least one battery module including a unit cell; a battery case configured to house the battery module and internally have a plurality of ventilation paths to pass refrigerant therethrough for cooling the battery module; and a distribution duct having a plurality of distribution paths to supply the refrigerant to each of the plurality of ventilation paths. A first distribution path of the plurality of distribution paths and a first ventilation path of the plurality of ventilation paths are connected together by an insertion structure in which one of the first distribution path and the first ventilation path having an open end with a smaller diameter is inserted into the other of the first distribution path and the first ventilation path having an open end with a larger diameter. The plurality of distribution paths have a second distribution path with an open end surrounded by a coupling portion extending in a direction of a cross section of the open end, and the second distribution path is connected to a second ventilation path of the plurality of ventilation paths via a planar sealing structure in which a sealing material is held on the coupling portion in a compressed state.

According to this configuration, the battery module's side and the distribution duct can be positioned by the insertion structure. The planar sealing structure allows a distribution path and the battery module to be connected over an increased area and can thus absorb a tolerance of a component in both a heightwise direction and a widthwise direction and hence reduce defective assembling of the distribution duct to the battery module.

In the above power storage device cooling structure, the plurality of distribution paths may have only one thereof connected to the ventilation path by the insertion structure. This is advantageous in terms of production because it can eliminate the necessity of processing with high precision a distribution path connected by the planar sealing structure.

In the above power storage device cooling structure, a path that would have a largest pressure loss if the plurality of distribution paths had all been connected to the ventilation paths via the planar sealing structure may be connected by the insertion structure. By applying the insertion structure to a path having a large pressure loss, a distribution path can be designed to have an appropriate shape to effectively reduce a pressure loss.

In the above power storage device cooling structure, the first distribution path connected via the insertion structure may have a portion having a cross-sectional area larger than a cross-sectional area of an outlet of the second distribution path connected via the planar sealing structure. The distribution path having an increased cross-sectional area to widen a flow path through the distribution path for refrigerant can reduce a flow rate of the refrigerant passing through the distribution path, and hence a pressure loss.

In the above power storage device cooling structure, the portion having the larger cross-sectional area may be a bent duct portion which is a bent portion of a duct forming the first distribution path. The distribution path thus formed can have an increased cross-sectional area to reduce a pressure loss and suppress a pressure loss otherwise increased as a flow of refrigerant passing through the bent duct portion would separate.

In the above power storage device cooling structure, one of the first distribution path and the first ventilation path having the open end with the smaller diameter may have a hook at the open end and the hook may be engaged with the other one of the first distribution path and the first ventilation path having the open end with the larger diameter to fix the first distribution path and the first ventilation path to each other, and one of the first distribution path and the first ventilation path having the open end with the smaller diameter may be provided with a tubular sealing material on an outer circumferential surface thereof farther away from the open end than the hook and the tubular sealing material may be hermetically pressed between and in contact with the outer circumferential surface and an inner circumferential surface of the other one of the first distribution path and the first ventilation path having the open end with the larger diameter. This ensures that the distribution and ventilation paths connected by the insertion structure are hermetic.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Hereinafter, a structure to cool a power storage device in an embodiment will be described with reference to the drawings. In the following embodiment, any identical or substantially identical configuration is identically denoted and will not be described redundantly.

Figure 1:
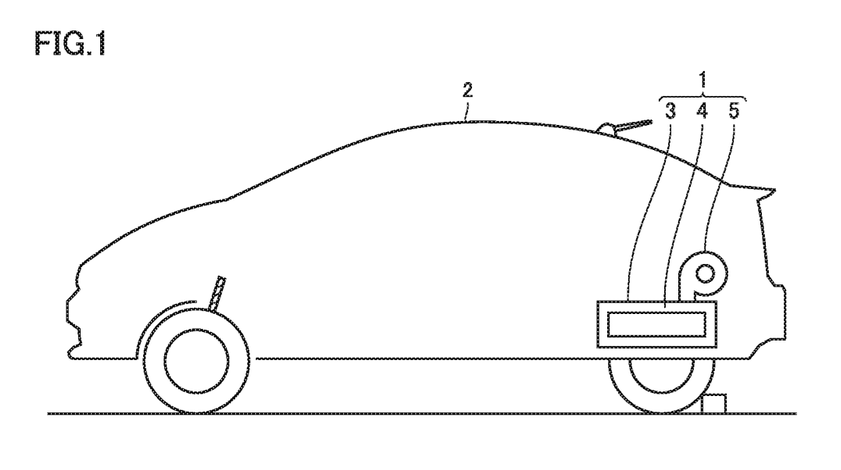
FIG. 1 is a schematic diagram showing a vehicle with a power storage device mounted therein.

FIG. 1 is a schematic diagram showing a vehicle 2 with a power storage device 1 mounted therein. As shown in FIG. 1, vehicle 2 includes power storage device 1 disposed therein. Vehicle 2 with power storage device 1 mounted therein may be a hybrid vehicle capable of traveling using power of at least one of a motor and an engine, or an electric vehicle which is driven by force obtained through electrical energy.

Power storage device 1 includes a battery case 3, a battery unit 4, and a fan 5. Battery unit 4 is accommodated in battery case 3. Fan 5 supplies an interior of battery case 3 with the air inside the passenger compartment.

Figure 2:
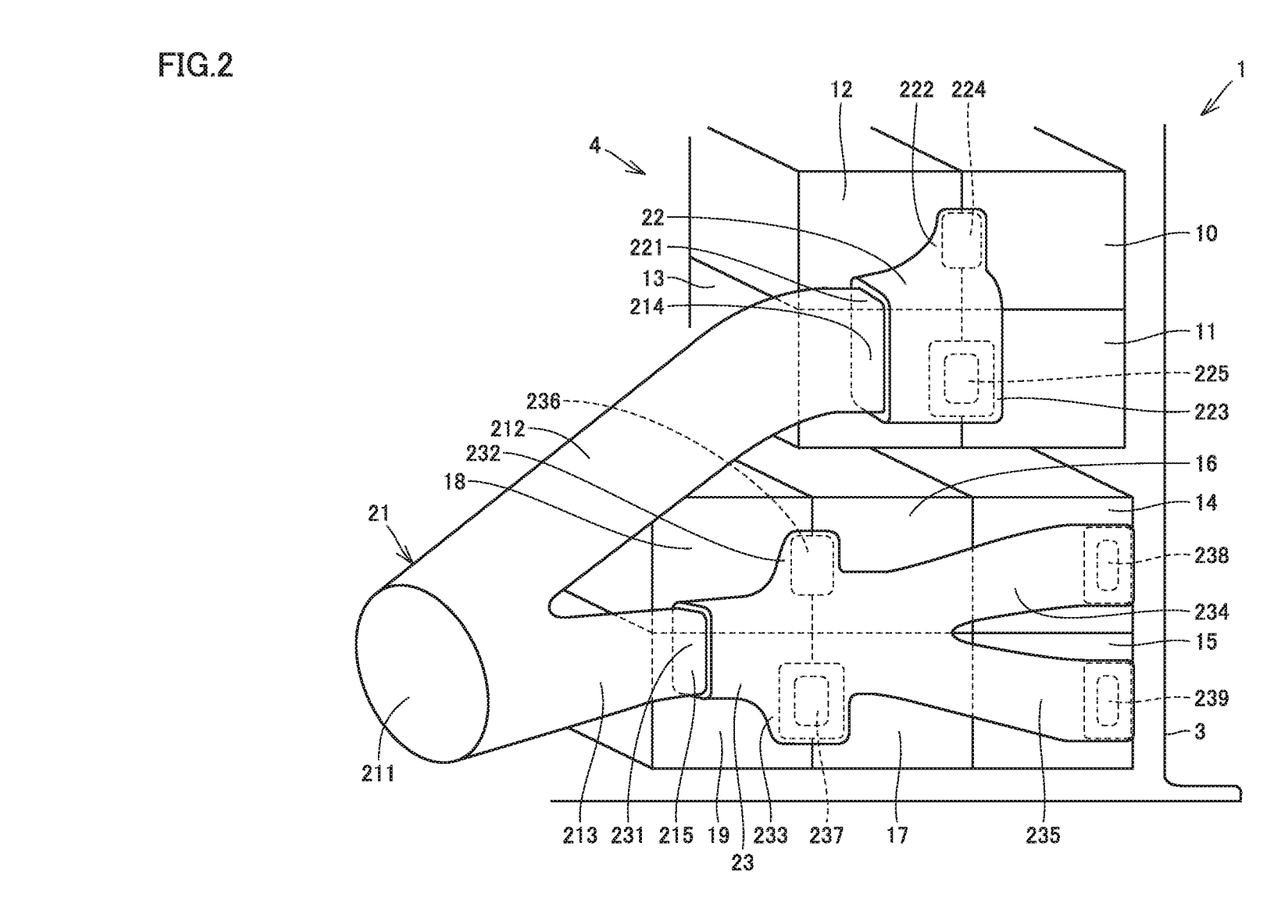
FIG. 2 is a schematic perspective view of the power storage device.

FIG. 2 is a schematic perspective view of power storage device 1. As shown in FIG. 2, battery unit 4 includes a plurality of battery modules 10 to 19. Battery modules 10 to 13 constitute a set, and battery modules 14 to 19 constitute another set. The set of battery modules 10 to 13 and the set of battery modules 14 to 19 are disposed in alignment in a vertical direction (an upward and downward direction). Above battery modules 14 to 19, battery modules 10 to 13 are disposed.

Battery modules 10 to 13 are disposed in two rows and two columns. Battery modules 10, 12 disposed side by side are placed on battery modules 11, 13 disposed side by side. Battery modules 10, 11 are stacked vertically in two tiers, and battery modules 12, 13 are stacked vertically in two tiers.

Battery modules 14 to 19 are disposed in two columns and three rows. Battery modules 14, 16, 18 disposed side by side are placed on battery modules 15, 17, 19 disposed side by side. Battery modules 14, 15 are stacked vertically in two tiers, battery modules 16, 17 are stacked vertically in two tiers, and battery modules 18, 19 are stacked vertically in two tiers.

Figure 3:
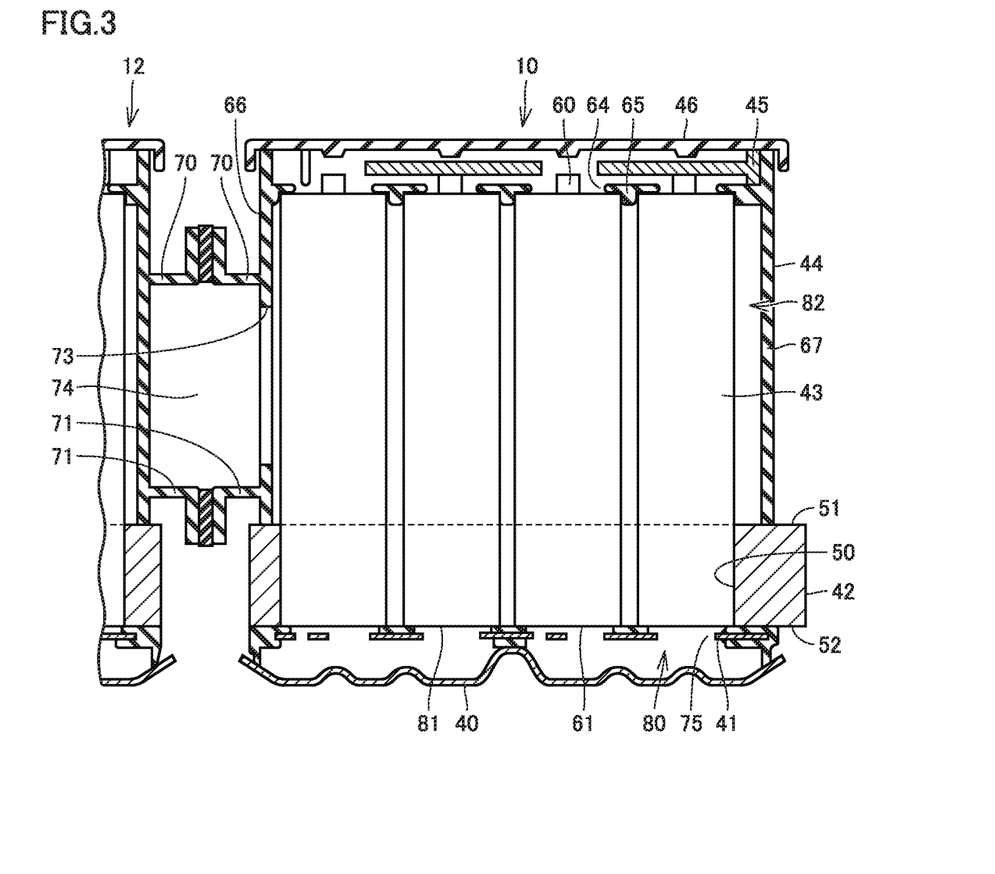
FIG. 3 is a cross-sectional view of a battery module and therearound.

FIG. 3 is a cross-sectional view of battery module 10 and therearound. Referring to FIG. 3, while a configuration of battery module 10 will be described in detail, the other battery modules 11 to 19 have the same configuration as battery module 10.

As shown in FIG. 3, battery module 10 includes a bottom lid 40, a negative electrode bus bar assembly 41, a heat dissipating plate 42, a cylindrical cell 43, a resin cover 44, a positive electrode bus bar 45, and a ceiling lid 46.

Heat dissipating plate 42 is a metal plate member. Heat dissipating plate 42 includes an upper surface 51 and a lower surface 52. Heat dissipating plate 42 has a plurality of through holes 50 extending therethrough from upper surface 51 to lower surface 52 in the direction of the thickness of heat dissipating plate 42. Through holes 50 are formed in an array.

Cylindrical cell 43 is a chargeable/dischargeable secondary cell. Cylindrical cell 43 may for example be a nickel metal hydride cell, a lithium ion cell, or the like. A positive electrode 60 is formed at an upper end portion of cylindrical cell 43, and a negative electrode 61 is formed at a lower end portion of cylindrical cell 43.

Cylindrical cell 43 is inserted into through hole 50 formed in heat dissipating plate 42. Cylindrical cell 43 has positive electrode 60 above upper surface 51 of heat dissipating plate 42. Cylindrical cell 43 has negative electrode 61 below lower surface 52 of heat dissipating plate 42.

A resin or the like is disposed between the inner circumferential surface of through hole 50 of heat dissipating plate 42 and the outer circumferential surface of cylindrical cell 43, and cylindrical cell 43 is thus fixed to heat dissipating plate 42.

Resin cover 44 is disposed on upper surface 51 of heat dissipating plate 42. Resin cover 44 is formed so as to open downward, and includes a pair of side walls 66, 67. Side walls 66 and 67 have lower end portions, respectively, on upper surface 51 of heat dissipating plate 42.

Side wall 66 has an upper flange 70 and a lower flange 71. Upper flange 70 and lower flange 71 are vertically spaced from each other. Side wall 66 has a plurality of ventilation ports 73 formed therethrough at a portion located between upper flange 70 and lower flange 71.

Upper flange 70 of battery module 10 is in close contact with upper flange 70 of battery module 12 disposed adjacent to battery module 10. Lower flange 71 of battery module 10 is in close contact with lower flange 71 of battery module 12. Consequently, a ventilation path 74 is formed between upper flanges 70 and lower flanges 71. Ventilation path 74 is connected via a cooling duct to fan 5.

Resin cover 44 has a top plate 65 with a plurality of holes 64 receiving positive electrodes 60 of cylindrical cells 43.

A plurality of positive electrode bus bars 45 are provided above top plate 65 of resin cover 44. For example, each positive electrode bus bar 45 connects positive electrodes 60 of about 10 cylindrical cells 43.

Ceiling lid 46 is disposed above positive electrode bus bar 45. Ceiling lid 46 is formed of an insulating material such as resin.

Negative electrode bus bar assembly 41 is disposed on the lower surface 52 side of heat dissipating plate 42. Negative electrode bus bar assembly 41 includes a plurality of negative electrode bus bars (not shown) and a resin mold holding the plurality of negative electrode bus bars. The external shape of the negative electrode bus bar and the external shape of positive electrode bus bar 45 are similar. A plurality of holes 75 are formed in negative electrode bus bar assembly 41 (or negative electrode bus bars), and cylindrical cell 43 has negative electrode 61 connected to a terminal (not shown) formed to protrude from an inner circumferential surface of each hole 75.

A plurality of cylindrical cells 43 are connected electrically in parallel by the negative electrode bus bar and positive electrode bus bar 45. Each positive electrode bus bar 45 and each negative electrode bus bar are electrically connected such that the sets of cells connected in parallel by the negative electrode bus bar and positive electrode bus bar 45 are connected in series.

Bottom lid 40 is disposed on the side of the lower surface of negative electrode bus bar assembly 41. Bottom lid 40 is made of a metal such as aluminum.

An exhaust path 80 is formed by bottom lid 40 and negative electrode bus bar assembly 41. A safety valve 81 is formed on the bottom surface of cylindrical cell 43, and safety valve 81 is exposed to exhaust path 80.

A ventilation chamber 82 is formed by resin cover 44 and heat dissipating plate 42, and ventilation chamber 82 and ventilation path 74 communicate with each other via ventilation ports 73.

Fan 5 supplies cooling air to ventilation path 74. Air for cooling battery modules 10, 12 flows to ventilation path 74 between battery modules 10 and 12. The cooling air passing through ventilation path 74 enters ventilation chamber 82 via ventilation port 73. Cylindrical cells 43 are cooled by the cooling air that has entered ventilation chamber 82.

Referring again to FIG. 2, as well as ventilation path 74 between battery modules 10 and 12 described above, ventilation path 74 is also formed between battery modules 11 and 13, between battery modules 16 and 18, and between battery modules 17 and 19. Ventilation path 74 is also formed at a side wall of battery module 14 and a side wall of battery module 15. Battery unit 4 has a plurality of ventilation paths 74. Battery case 3 has a plurality of ventilation paths 74 therein. Two ventilation paths 74 are formed for the four upper battery modules 10 to 13. Four ventilation paths 74 are formed for the lower six battery modules 14 to 19.

Power storage device 1 comprises an air intake duct 21 to pass air blown from fan 5 shown in FIG. 1, and distribution ducts 22, 23 to divide the air passing through air intake duct 21 in two for distribution. Air intake duct 21 and distribution ducts 22 and 23 constitute a cooling duct for supplying refrigerant from fan 5 to each ventilation path 74 for cooling battery modules 10 to 19.

Air intake duct 21 has an inlet 211 and branching ducts 212 and 213. Branching duct 212 has an outlet 214 and branching duct 213 has an outlet 215. Fan 5 (see FIG. 1) blows air which in turn flows through inlet 211 into air intake duct 21 and branches inside air intake duct 21 into branching ducts 212 and 213. Branching duct 212 receives the air, which in turn passes through outlet 214 and flows out of air intake duct 21. Branching duct 213 also receives the air flowing thereinto, which in turn passes through outlet 215 and flows out of air intake duct 21.

Outlet 214 of air intake duct 21 communicates with inlet 221 of distribution duct 22. The air flowing out of outlet 214 flows into distribution duct 22 through inlet 221. Outlet 215 of air intake duct 21 communicates with inlet 231 of distribution duct 23. The air flowing out of outlet 215 flows into distribution duct 23 through inlet 231. A portion of the air flowing into air intake duct 21 flows into distribution duct 22 and the rest flows into distribution duct 23.

Distribution duct 22 has two distribution paths 222, 223. The air flowing into distribution duct 22 is distributed inside distribution duct 22 to distribution paths 222, 223. Distribution path 222 has an open outlet end 224, and distribution path 223 has an open outlet end 225. The air flowing into distribution path 222 flows out of distribution duct 22 through open outlet end 224. The air flowing into distribution path 223 flows out of distribution duct 22 through open outlet end 225.

Open outlet end 224 of distribution path 222 communicates with ventilation path 74 formed between battery module 10 and battery module 12. The air flowing out through open outlet end 224 flows into ventilation path 74 between battery modules 10 and 12. The cooling air for cooling battery modules 10 and 12 is supplied from fan 5 through branching duct 212 of air intake duct 21 and then distribution path 222 of distribution duct 22 to ventilation path 74 between battery modules 10 and 12.

Open outlet end 225 of distribution path 223 communicates with ventilation path 74 formed between battery module 11 and battery module 13. The air flowing out through open outlet end 225 flows into ventilation path 74 between battery modules 11 and 13. The cooling air for cooling battery modules 11 and 13 is supplied from fan 5 through branching duct 212 of air intake duct 21 and then distribution path 223 of distribution duct 22 to ventilation path 74 between battery modules 11 and 13.

Distribution duct 23 has four distribution paths 232, 233, 234, 235. The air flowing into distribution duct 23 is distributed inside distribution duct 23 to distribution paths 232, 233, 234, 235. Distribution paths 232, 233, 234, 235 have open outlet ends 236, 237, 238, 239, respectively. The air flowing into distribution path 232 flows out of distribution duct 23 through open outlet end 236. The air flowing into distribution path 233 flows out of distribution duct 23 through open outlet end 237. The air flowing into distribution path 234 flows out of distribution duct 23 through open outlet end 238. The air flowing into distribution path 235 flows out of distribution duct 23 through open outlet end 239.

Open outlet end 236 of distribution path 232 communicates with ventilation path 74 formed between battery module 16 and battery module 18. The air flowing out through open outlet end 236 flows into ventilation path 74 between battery modules 16 and 18. The cooling air for cooling battery modules 16 and 18 is supplied from fan 5 through branching duct 213 of air intake duct 21 and then distribution path 232 of distribution duct 23 to ventilation path 74 between battery modules 16 and 18.

Open outlet end 237 of distribution path 233 communicates with ventilation path 74 formed between battery module 17 and battery module 19. The air flowing out through open outlet end 237 flows into ventilation path 74 between battery modules 17 and 19. The cooling air for cooling battery modules 17 and 19 is supplied from fan 5 through branching duct 213 of air intake duct 21 and then distribution path 233 of distribution duct 23 to ventilation path 74 between battery modules 17 and 19.

Open outlet end 238 of distribution path 234 communicates with ventilation path 74 formed at the side wall of battery module 14. The air flowing out through open outlet end 238 flows into ventilation path 74 at the side wall of battery module 14. The cooling air for cooling battery module 14 is supplied from fan 5 through branching duct 213 of air intake duct 21 and then distribution path 234 of distribution duct 23 to ventilation path 74 located at the side wall of battery module 14.

Open outlet end 239 of distribution path 235 communicates with ventilation path 74 formed at the side wall of battery module 15. The air flowing out through open outlet end 239 flows into ventilation path 74 at the side wall of battery module 15. The cooling air for cooling battery module 15 is supplied from fan 5 through branching duct 213 of air intake duct 21 and then distribution path 235 of distribution duct 23 to ventilation path 74 located at the side wall of battery module 15.

Figure 4:
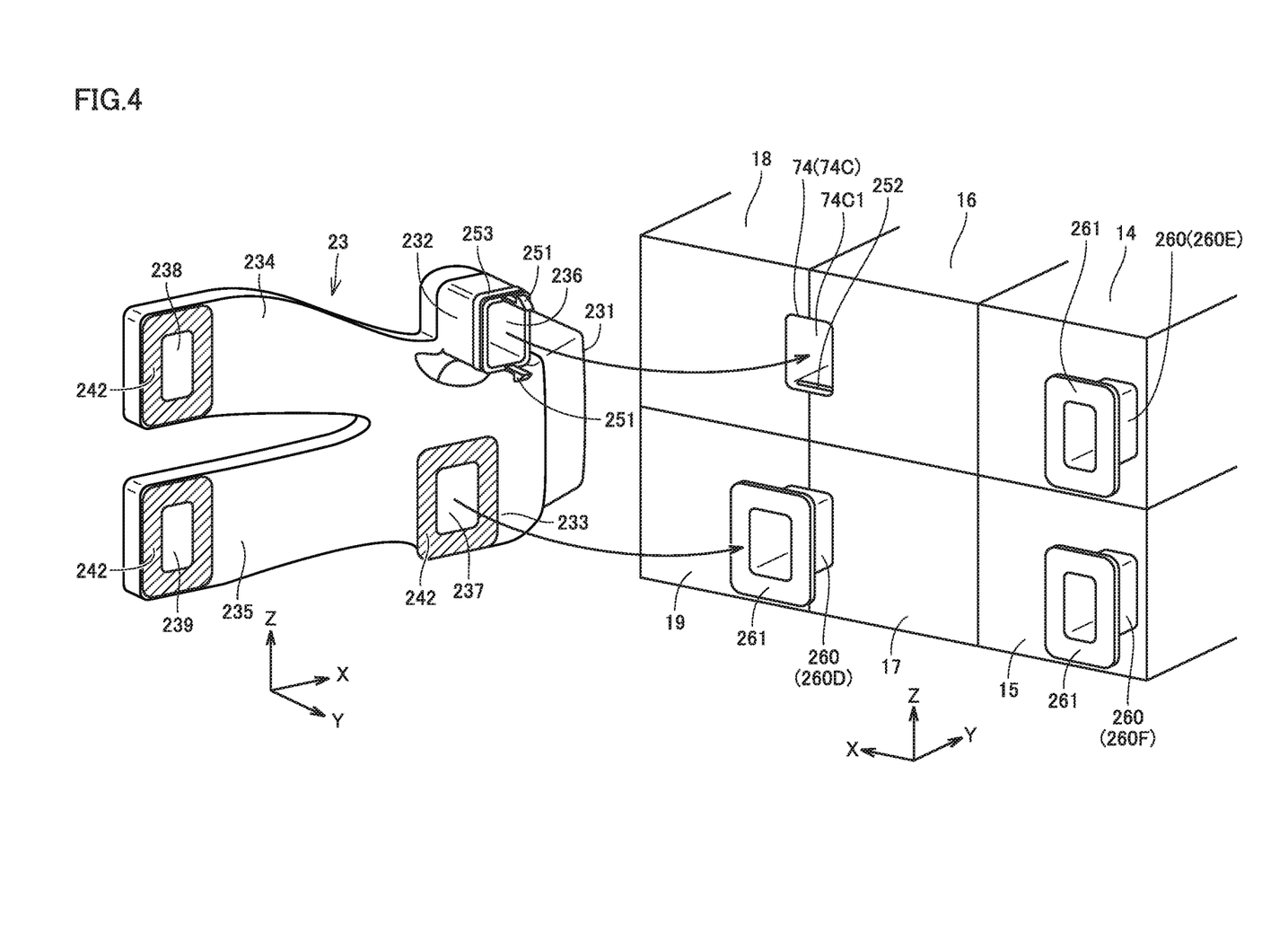
FIG. 4 is a perspective view showing a relationship between a distribution duct and air intake ports to battery modules.

FIG. 4 is a perspective view showing a relationship between distribution duct 23 and air intake ports to battery modules 14 to 19. As shown in FIG. 4, with distribution duct 23 detached from battery modules 14 to 19, ventilation path 74 between battery modules 16 and 18 (i.e., a ventilation path 74C) is exposed at surfaces of battery modules 16 and 18, and an open inlet end 74C1 opens at the surfaces of battery modules 16 and 18. In contrast, a coupling duct 260 (a coupling duct 260D) is attached to ventilation path 74 between battery modules 17 and 19 (described later as a ventilation path 74D). Coupling duct 260 (a coupling duct 260E) is attached to ventilation path 74 at the side wall of battery module 14. Coupling duct 260 (a coupling duct 260F) is attached to ventilation path 74 at the side wall of battery module 15.

Coupling duct 260 has an open inlet end which is located at a protruding end protruding from a battery module and serves as an inlet of the cooling air to coupling duct 260. Coupling duct 260 has a coupling portion 261 surrounding the open inlet end and extending in a direction of a cross section of the open inlet end. Coupling portion 261 has a shape in which coupling duct 260 is increased in diameter at the open inlet end. Coupling portion 261 has a flat flange surface.

Distribution paths 233, 234, 235 corresponding to ventilation path 74 to which coupling duct 260 is attached have a coupling portion 241 (not shown in FIG. 4) surrounding open outlet ends 237, 238, 239 and extending in a direction of cross sections of open outlet ends 237, 238, 239. Coupling portion 241 has a flat surface. A sealing material 242 is attached to the flat surface of coupling portion 241. As shown in FIG. 4, sealing material 242 is provided to surround open outlet ends 237, 238, 239 of distribution paths 233, 234, 235.

Distribution path 232 corresponding to ventilation path 74 (ventilation path 74C) to which coupling duct 260 is not attached has a pair of upper and lower hooks 251 at open outlet end 236. A tubular sealing material 253 is provided on an outer circumferential surface of distribution path 232 at a position farther away from open outlet end 236 than hooks 251.

Ventilation path 74 has a floor surface with an engagement portion 252 which is a portion of the floor surface raised in the form of a ridge. Although not shown in FIG. 4, ventilation path 74 also has a ceiling surface with engagement portion 252 which is a portion of the ceiling surface raised in the form of a ridge. On the other hand, ventilation path 74 has side wall surfaces without the engagement portion.

Figure 5:
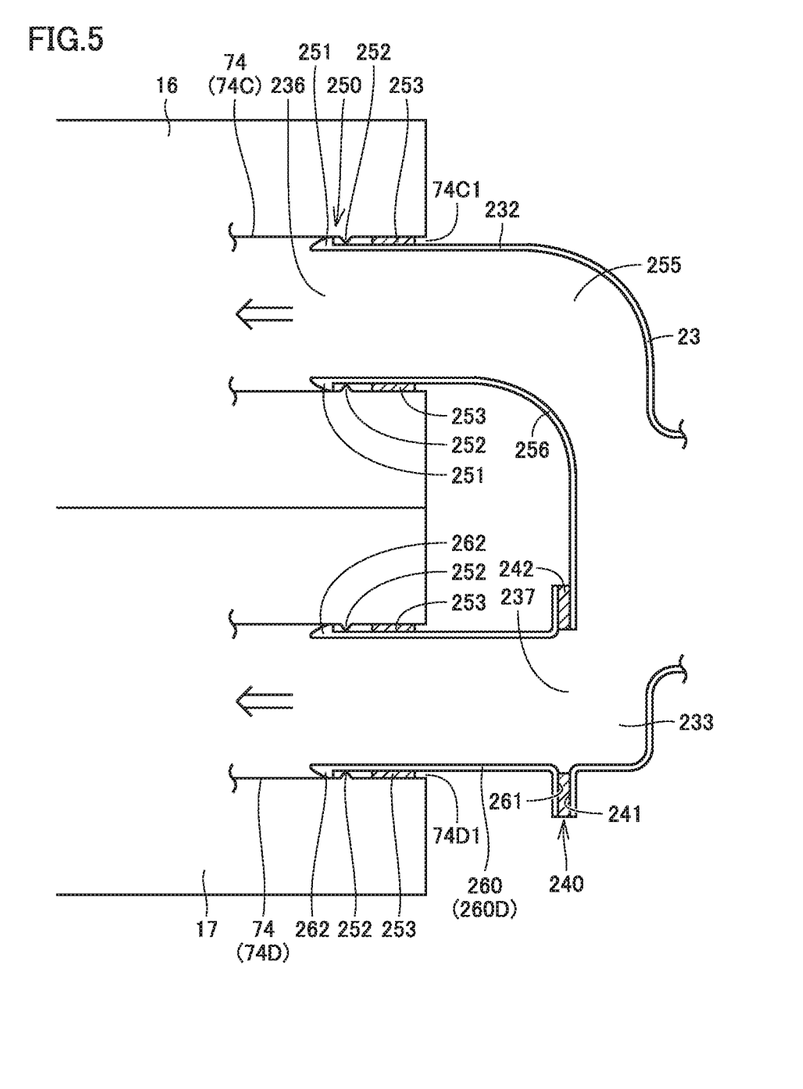
FIG. 5 is a cross-sectional view showing a relationship between a distribution duct and air intake ports to battery modules.

FIG. 5 is a cross-sectional view showing a relationship between distribution duct 23 and air intake ports to battery modules 14 to 19. FIG. 5 shows battery modules 14 to 19 with distribution duct 23 attached thereto, more specifically, a vertical cross-sectional view including distribution paths 232 and 233 of the plurality of distribution paths 232, 233, 234, 235 of distribution duct 23.

As shown in FIG. 5, open outlet end 236 of distribution path 232 is smaller in diameter than open inlet end 74C1 of ventilation path 74C. Distribution path 232 is inserted into ventilation path 74 (ventilation path 74C). The pair of upper and lower hooks 251 provided at open outlet end 236 of distribution path 232 engages with the pair of upper and lower engagement portions 252 formed on the floor and ceiling surfaces of ventilation path 74C to fix distribution path 232 to ventilation path 74C. Distribution path 232 and ventilation path 74C are connected by an insertion structure 250 in which distribution path 232 having an open end with a smaller diameter is inserted into ventilation path 74C having an open end with a larger diameter. Distribution path 232 is inserted into ventilation path 74C until hook 251 of the tip proceeds beyond engagement portion 252 and is thus disposed in ventilation path 74C at a position behind engagement portion 252.

Tubular sealing material 253 attached to an outer circumferential surface of distribution path 232, as shown in FIG. 4, is sandwiched between the outer circumferential surface of distribution path 232 and an inner circumferential surface of ventilation path 74C and thus compressed. Tubular sealing material 253 pressed into contact with both the outer circumferential surface of distribution path 232 and the inner circumferential surface of ventilation path 74C ensures hermeticity between distribution path 232 and ventilation path 74C. In insertion structure 250, an axially sealing structure is formed in which distribution path 232 has the outer circumferential surface radially inwardly of tubular sealing material 253 and ventilation path 74C has the inner circumferential surface radially outwardly of tubular sealing material 253, and tubular sealing material 253 is radially compressed and thus provides hermeticity. Tubular sealing material 253 seals between two members (i.e., distribution path 232 and ventilation path 74C) extending in a direction in which the cooling air flows. Arrows indicated in FIG. 5 indicate the direction in which the cooling air flows.

Distribution path 233 is not inserted into ventilation path 74 (ventilation path 74D); rather, it is disposed outside ventilation path 74D. In ventilation path 74D, coupling duct 260D is inserted. The open outlet end of coupling duct 260D is smaller in diameter than an open inlet end 74D1 of ventilation path 74D. Coupling duct 260D has a pair of upper and lower hooks 262 at a base end thereof opposite to a protruding end thereof protruding from a battery module. The pair of upper and lower hooks 262 engages with the pair of upper and lower engagement portions 252 formed on the floor and ceiling surfaces of ventilation path 74 to fix coupling duct 260D to ventilation path 74D. Coupling duct 260D and ventilation path 74D are connected by insertion structure 250 in which coupling duct 260D is inserted into ventilation path 74D.

Tubular sealing material 253 is provided on an outer circumferential surface of coupling duct 260D at a position farther away from the base end than hooks 262. Tubular sealing material 253 is sandwiched between the outer circumferential surface of coupling duct 260D and an inner circumferential surface of ventilation path 74D and thus compressed. Tubular sealing material 253 pressed into contact with both the outer circumferential surface of coupling duct 260D and the inner circumferential surface of ventilation path 74D forms the above described axial sealing structure to ensure hermeticity between coupling duct 260D and ventilation path 74D.

Distribution path 233 has coupling portion 241 surrounding open outlet end 237. Coupling portion 241 is partially formed as a surface of a flange portion (i.e., a flange surface) at which distribution path 233 has an outlet end partially increased in diameter. Coupling portion 261 of coupling duct 260D also has a flat flange surface. The flange surface of coupling portion 241 and the flange surface of coupling portion 261 are both planar and disposed in parallel. Sealing material 242 attached to coupling portion 241 is sandwiched and compressed by coupling portion 241 of distribution path 233 and coupling portion 261 of coupling duct 260D.

Sealing material 242 pressed into contact with both coupling portion 241 and coupling portion 261 ensures hermeticity between distribution path 233 and coupling duct 260D. Distribution path 233 and coupling duct 260D are connected by a planar sealing structure 240 in which coupling portion 241 is present on one side in an axial direction with respect to sealing material 242 and coupling portion 261 is present on the other side in the axial direction with respect to sealing material 242, and sealing material 242 is axially compressed and thus provides hermeticity. Sealing material 242 seals between two members (distribution path 233 and coupling duct 260D) extending in a direction traversing (typically, orthogonal to) the direction in which the cooling air flows.

As shown in FIG. 5, distribution path 232 has a bent duct portion 255 which is a bent portion of a duct forming distribution path 232. Distribution path 232 has an arcuate curved surface 256 on an inside of the curve of bent duct portion 255. Arcuate curved surface 256 has a smaller curvature than a surface of bent duct portion 255 on an outside of the curve of bent duct portion 255. Therefore, bent duct portion 255 has an increased cross-sectional area. Distribution path 232 has in bent duct portion 255 a portion having a cross-sectional area larger than a cross-sectional area of distribution path 233 at open outlet end 237.

Bent duct portion 255 of distribution path 232 has a portion which is located closer to a battery module than a location where distribution path 233 is connected to coupling duct 260D via planar sealing structure 240. Arcuate curved surface 256 has at least a portion located closer to a battery module than a location where distribution path 233 is connected to coupling duct 260D via planar sealing structure 240.

In the structure which cools power storage device 1 according to the embodiment, as has been described above, as shown in FIGS. 4 and 5, distribution path 232 and ventilation path 74C are connected by insertion structure 250 in which distribution path 232 is inserted into ventilation path 74C. As shown in FIG. 5, distribution path 233 has coupling portion 241 surrounding open outlet end 237, and is connected to ventilation path 74D via planar sealing structure 240 in which sealing material 242 is held on coupling portion 241 in a compressed state. Distribution duct 23 which distributes cooling air to a plurality of ventilation paths 74 has both distribution path 232 connected to a battery module via insertion structure 250 and distribution paths 233, 234, 235 connected to battery modules via planar sealing structure 240.

According to this configuration, a battery module's side and distribution duct 23 can be positioned by engaging hook 251 and engagement portion 252 in insertion structure 250. Planar sealing structure 240 allows distribution path 233 and a battery module to be connected over an increased area and can thus absorb a tolerance of a component in both a heightwise direction and a widthwise direction and hence reduce defective assembling of distribution duct 23 to the battery module.

As shown in FIG. 4, of distribution paths 232, 233, 234, 235 of distribution duct 23, only one distribution path 232 is connected to ventilation path 74 by insertion structure 250. As has been described above, since a battery module's side and distribution duct 23 are positioned by insertion structure 250 and planar sealing structure 240 absorbs a tolerance, connecting a plurality of distribution paths by insertion structure 250 will require the plurality of distribution paths to be processed with high precision. By adopting a configuration according to the embodiment in which only one distribution path 232 is connected by insertion structure 250, it is not necessary to process with high precision the other distribution paths 233, 234, 235 connected by planar sealing structure 240, which is advantageous in terms of production.

Distribution path 232 connected by insertion structure 250 configures a path that would have a largest pressure loss if distribution duct 23 had the plurality of distribution paths 232, 233, 234, 234 all connected to ventilation path 74 via planar sealing structure 240. Distribution path 232 connected to a battery module by insertion structure 250 does not need to have a plane (an annular plane) for forming the planar sealing structure, and has a high degree of freedom of shape. By applying insertion structure 250 to a path having a large pressure loss, distribution path 232 can be designed to have an appropriate shape to effectively reduce the pressure loss. Distribution path 232 can thus supply ventilation path 74C having distribution path 232 connected thereto with a large amount of cooling air and thus enhance performance of cooling battery modules 16, 18.

As shown in FIG. 5, distribution path 232 connected by insertion structure 250 has a portion having the cross-sectional area larger than the cross-sectional area of distribution path 233 at open outlet end 237 connected via planar sealing structure 240. Distribution path 232 having an increased cross-sectional area to widen a flow path through distribution path 232 for refrigerant can reduce a flow rate of the refrigerant passing through distribution path 232, and hence a pressure loss.

As shown in FIG. 5, a portion of distribution path 232 connected by insertion structure 250 that has the larger cross-sectional area is bent duct portion 255 that is a bent portion of a duct forming distribution path 232. Bent duct portion 255 has arcuate curved surface 256 on the inside of its curve. Distribution path 232 thus formed can have an increased cross-sectional area to reduce a pressure loss and suppress a pressure loss otherwise increased as a flow of refrigerant passing through bent duct portion 255 would separate.

As shown in FIGS. 4 and 5, distribution path 232 has open outlet end 236 with hook 251. Ventilation path 74C has engagement portion 252. Hook 251 is engaged with engagement portion 252 of ventilation path 74C to fix distribution path 232 and ventilation path 74C to each other. Tubular sealing material 253 is provided on an outer circumferential surface of distribution path 232. As shown in FIG. 5, tubular sealing material 253 is pressed between the outer circumferential surface of distribution path 232 and an inner circumferential surface of ventilation path 74C in contact therewith to provide hermeticity.

This can provide an axial sealing structure to ensure that distribution path 232 and ventilation path 74C connected by insertion structure 250 are hermetic. Hook 251 provided closer to the tip than tubular sealing material 253 and engaged with engagement portion 252 to fix distribution path 232 to ventilation path 74C allows distribution path 232 to be positioned with respect to a battery module with improved precision.

Engagement portion 252 to which hook 251 is engaged is formed on the floor and ceiling surfaces of ventilation path 74C and is not formed on side wall surfaces thereof. Forming engagement portion 252 only at a position corresponding to hook 251 allows ventilation path 74C to be formed in a simple shape and also ensures a wider flow path for the cooling air.

In the above embodiment, a relationship between four ventilation paths 74 and distribution duct 23 formed for six lower battery modules 14 to 19 has been described. Distribution duct 22 supplying four upper battery modules 10 to 13 with cooling air also comprises a distribution path connected to a battery module via the insertion structure and a distribution path connected to a battery module via the planar sealing structure.

Specifically, as shown in FIG. 2, distribution path 222 is connected to ventilation path 74 between battery modules 10 and 12 via the insertion structure, and distribution path 223 is connected to ventilation path 74 between battery modules 11 and 13 via the planar sealing structure. Distribution path 222 is inserted into ventilation path 74 between battery modules 10 and 12, and distribution path 223 is connected to a planar sealing structure formed between distribution path 223 and a coupling duct inserted into ventilation path 74 between battery modules 11 and 13.

In the embodiment, for planar sealing structure 240 of distribution path 233 and coupling duct 260D, an example has been described in which a portion of coupling portion 241 of distribution path 233 is formed as a flange surface and coupling portion 261 of coupling duct 260D is formed as a flange surface. Coupling portion 241 of distribution path 233 may entirely be formed as a flange surface. Alternatively, coupling portion 241 of distribution path 233 may not be formed to be a flange at which distribution path 233 is increased in diameter. For example, if distribution path 233 has a sufficient wall thickness, sealing material 242 may be attached to an annular end surface of distribution path 233. Rather than having coupling portion 261 formed to be a flange surface, coupling duct 260D may also be configured to have an end surface with which sealing material 242 is pressed into contact.

In the embodiment, an example has been described in which distribution path 232 and ventilation path 74C are connected by insertion structure 250 in which distribution path 232 having an open end with a smaller diameter is inserted into ventilation path 74C having an open end with a larger diameter. The open ends may have their diameters in a relationship opposite in magnitude to that in the embodiment. In other words, the battery case may have a ventilation path with an open end having a smaller diameter and a distribution duct may have a distribution path with a larger diameter, and the ventilation path may be inserted into the distribution path to form the insertion structure.

In the embodiment, an example has been described in which a distribution duct has one distribution path connected to a ventilation path by the insertion structure and the other distribution paths connected to ventilation paths via the planar sealing structure. The insertion structure is not limited to connecting only a single distribution path to a ventilation path. A distribution path and a ventilation path processed with improved precision allow the insertion structure to connect two or more distribution paths to ventilation paths.

While in this embodiment an example in which cylindrical cell 43 is adopted as a unit cell has been described, it may be a prismatic cell or a capacitor.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A power storage device cooling structure comprising:
   at least one battery module including a unit cell;
   a battery case configured to house the at least one battery module and internally have a plurality of ventilation paths to pass refrigerant therethrough for cooling the at least one battery module; and
   a distribution duct having a plurality of distribution paths to supply the refrigerant to each of the plurality of ventilation paths,
   a first distribution path of the plurality of distribution paths and a first ventilation path of the plurality of ventilation paths being connected together by an insertion structure in which one of the first distribution path and the first ventilation path has an open end inserted into an open end of the other of the first distribution path and the first ventilation path, and
   the plurality of distribution paths having a second distribution path with an open end surrounded by a coupling portion extending in a direction of a cross section of the open end, the second distribution path being connected to a second ventilation path of the plurality of ventilation paths via a planar sealing structure in which a sealing material is held on the coupling portion in a compressed state, so that the open end of the second distribution path is not connected with an open end of the second ventilation path by insertion.

2. The power storage device cooling structure according to claim 1, wherein only the first distribution path of the plurality of distribution paths is connected to the plurality of ventilation paths by the insertion structure.

3. The power storage device cooling structure according to claim 2, wherein a path that would have a largest pressure loss if the plurality of distribution paths had all been connected to the plurality of ventilation paths via the planar sealing structure is connected by the insertion structure.

4. The power storage device cooling structure according to claim 1, wherein the first distribution path has a portion having a cross-sectional area larger than a cross-sectional area of an outlet of the second distribution path.

5. The power storage device cooling structure according to claim 4, wherein the portion having the larger cross-sectional area is a bent duct portion which is a bent portion of a duct forming the first distribution path.

6. The power storage device cooling structure according to claim 1, wherein
   the one of the first distribution path and the first ventilation path having the open end that is inserted has a hook at the open end and the hook is engaged with the other one of the first distribution path and the first ventilation path to fix the first distribution path and the first ventilation path to each other, and
   the one of the first distribution path and the first ventilation path having the open end that is inserted is provided with a tubular sealing material on an outer circumferential surface thereof farther away from the open end than the hook and the tubular sealing material is hermetically pressed between and in contact with the outer circumferential surface and an inner circumferential surface of the other one of the first distribution path and the first ventilation path.

* * * * *